(12) United States Patent
Murakami (10) Patent No.: US 11,827,108 B2
(45) Date of Patent: Nov. 28, 2023

(54) BATTERY STATE NOTIFICATION APPARATUS FOR ELECTRIC VEHICLE

(71) Applicant: SUBARU CORPORATION, Tokyo (JP)

(72) Inventor: Tsukasa Murakami, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 337 days.

(21) Appl. No.: 17/137,569

(22) Filed: Dec. 30, 2020

(65) Prior Publication Data

US 2021/0245604 A1 Aug. 12, 2021

(30) Foreign Application Priority Data

Feb. 10, 2020 (JP) ................................. 2020-020338

(51) Int. Cl.
*B60L 3/00* (2019.01)
*B60Q 5/00* (2006.01)
(Continued)

(52) U.S. Cl.
CPC ............. *B60L 3/0046* (2013.01); *B60L 50/66* (2019.02); *B60L 58/12* (2019.02); *B60Q 5/005* (2013.01)

(58) Field of Classification Search
None
See application file for complete search history.

(56) References Cited

U.S. PATENT DOCUMENTS

| 2010/0044126 A1 | 2/2010 | Ohmo |
| 2010/0214055 A1 | 8/2010 | Fuji et al. |

(Continued)

FOREIGN PATENT DOCUMENTS

| JP | 2000-92605 A | 3/2000 |
| JP | 2010-76736 A | 4/2010 |

(Continued)

OTHER PUBLICATIONS

Notice of Reasons for Refusal issued in Japanese Patent Application No. 2020-020338 dated Aug. 8, 2023, with machine translation.

*Primary Examiner* — Peter D Nolan
*Assistant Examiner* — Jacob Kent Besteman-Street
(74) *Attorney, Agent, or Firm* — TROUTMAN PEPPER HAMILTON SANDERS LLP (57) ABSTRACT

A battery state notification apparatus for an electric vehicle includes a collision detector, an electric leakage detector, a surrounding condition detector, a vehicle exterior sounding device, and a battery state notification device. The collision detector detects a collision of the electric vehicle. The electric leakage detector detects a state of the electric leakage from the drive battery. The surrounding condition detector detects a surrounding condition including the presence of a person around the electric vehicle. The vehicle exterior sounding device outputs a sound to the outside of the electric vehicle. The battery state notification device causes the vehicle exterior sounding device to make notification about the state of electric leakage from the drive battery in a case where the collision detector detects the collision of the electric vehicle and where the surrounding condition detector detects the presence of the person around the electric vehicle.

11 Claims, 3 Drawing Sheets

(51) Int. Cl.
    *B60L 58/12*     (2019.01)
    *B60L 50/60*     (2019.01)

(56)            References Cited

U.S. PATENT DOCUMENTS

2016/0018345 A1*  1/2016  Park .................... G01R 31/367
                                                           702/63
2018/0162271 A1*  6/2018  Kim ....................... G08G 1/166
2018/0366792 A1* 12/2018  Stachewicz .............. B60Q 1/52

FOREIGN PATENT DOCUMENTS

JP          2010-193691 A      9/2010
JP          2011-217544 A     10/2011
JP           2012-39776 A      2/2012

\* cited by examiner

BATTERY STATE NOTIFICATION APPARATUS FOR ELECTRIC VEHICLE

CROSS-REFERENCE TO RELATED APPLICATIONS

The present application claims priority from Japanese Patent Application No. 2020-020338 filed on Feb. 10, 2020, the entire contents of which are hereby incorporated by reference.

BACKGROUND

The technology relates to a battery state notification apparatus for an electric vehicle. For example, the technology relates to a battery state notification apparatus that makes notification about a state of electric leakage from a drive battery after a collision of an electric vehicle.

An electric vehicle, such as a hybrid vehicle, is provided with a motor generator that drives the vehicle. The motor generator that drives the vehicle generally generates high voltage and large current to produce sufficient driving power. Accordingly, a drive battery that supplies electric power to the motor generator also generates high voltage and has a large capacity. The electric vehicle provided with such a high-voltage drive battery can cause electric leakage from the drive battery when making a collision. The drive battery is generally coupled only to a drive circuit, such as an inverter, that drives the motor generator. Thus, techniques disclosed in Japanese Unexamined Patent Application Publication (JP-A) Nos. 2010-76736 and 2010-193691 employ a configuration in which a switch provided between the motor generator and the drive circuit is turned off upon detection of a collision of the vehicle. A technique disclosed in JP-A No. 2000-92605 employs a configuration in which the drive battery includes a plurality of direct-current (DC) power cells, and switches provided between the DC power cells are turned off upon the detection of a collision of the vehicle.

SUMMARY

An aspect of the technology provides a battery state notification apparatus for an electric vehicle. The apparatus is configured to make notification about a state of electric leakage from a drive battery after a collision of the electric vehicle. The apparatus includes a collision detector, an electric leakage detector, a surrounding condition detector, a vehicle exterior sounding device, and a battery state notification device. The collision detector is configured to detect the collision of the electric vehicle. The electric leakage detector is configured to detect the state of the electric leakage from the drive battery. The surrounding condition detector is configured to detect a surrounding condition around the electric vehicle. The surrounding condition includes the presence of a person around the electric vehicle. The vehicle exterior sounding device is configured to output a sound to an outside of the electric vehicle. The battery state notification device is configured to cause the vehicle exterior sounding device to make the notification about the state of the electric leakage from the drive battery detected by the electric leakage detector in a case where the collision detector detects the collision of the electric vehicle and where the surrounding condition detector detects the presence of the person around the electric vehicle.

An aspect of the technology provides a battery state notification apparatus for an electric vehicle. The apparatus is configured to make notification about a state of electric leakage from a drive battery after a collision of the electric vehicle. The apparatus includes: a surrounding condition detector configured to detect a surrounding condition around the electric vehicle; a vehicle exterior sounding device configured to output a sound to an outside of the electric vehicle; and circuitry. The surrounding condition includes the presence of a person around the electric vehicle. The circuitry is configured to: detect the collision of the electric vehicle; detect the electric leakage from the drive battery; and cause the vehicle exterior sounding device to make the notification about the detected state of the electric leakage from the drive battery in a case where the collision of the electric vehicle is detected and where the surrounding condition detector detects the presence of the person around the electric vehicle.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Techniques disclosed in JP-A Nos. 2010-76736, 2010-193691, and 2000-92605 have difficulties in eliminating a possibility of electric leakage from a drive battery upon a collision of an electric vehicle. Additionally, these techniques still have room to eliminate a possibility of giving electrical shock to a person if the person touches the vehicle when electricity is leaking from the drive battery.

It is desirable to provide a battery state notification apparatus for an electric vehicle that avoids giving electrical shock upon a collision of an electric vehicle.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
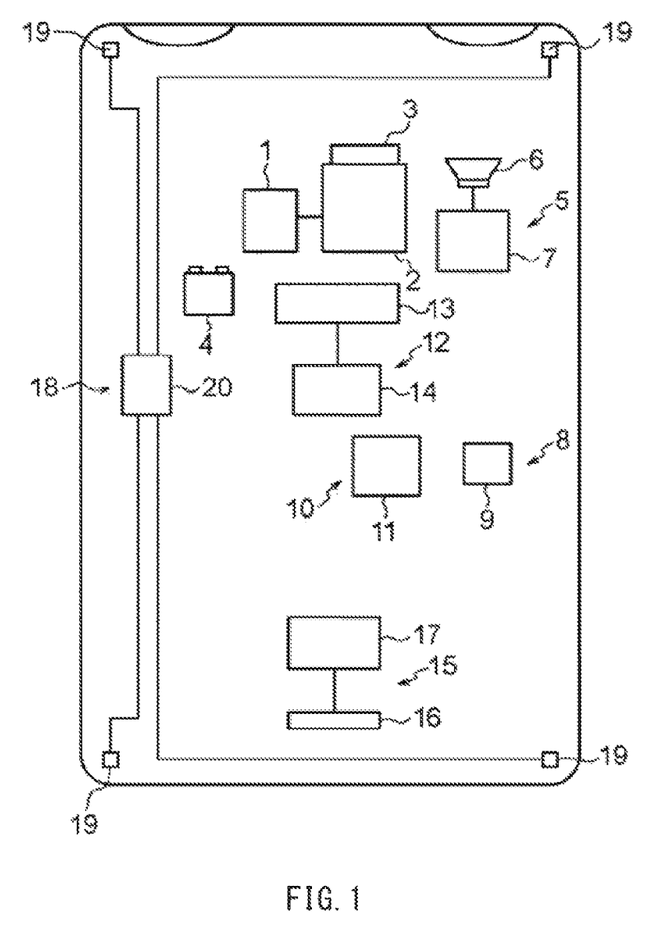
FIG. 1 is a schematic diagram illustrating an exemplary configuration of an electric vehicle to which a battery state notification apparatus according to one example embodiment of the technology is applied.

A battery state notification apparatus for an electric vehicle according to an example embodiment of the technology will now be described in detail with reference to the accompanying drawings. FIG. 1 schematically illustrates an electric vehicle to which the battery state notification apparatus according to the example embodiment is applied. The electric vehicle may include a motor generator 1 serving as a drive source that drives the vehicle. The motor generator 1 may include a high-voltage, large-capacity drive battery 2 that supplies high-voltage, large-current electric power to the motor generator 1. For example, the drive battery 2 may be a lithium-ion battery chargeable by regenerative electric power of the motor generator 1 while the motor generator 1 is used as a generator. The operating state of the motor generator 1 may be controlled by a non-illustrated power controller. The drive battery 2 may further include a battery controller 3 monitoring a voltage, a current, a temperature, and charging and discharging states, averaging constituent cell voltages, and detecting electric leakage, for example. In one embodiment, the battery controller 3 may serve as an "electric leakage detector". The electric vehicle may further include an auxiliary battery 4 serving as a power source for electrical components including various controllers described below. The auxiliary battery 4 may be a DC battery of 12 volts, for example. The electric vehicle may also include an engine as a driving power source of the vehicle.

The electric vehicle includes a vehicle exterior sounding system 5 that makes notification about the presence of the vehicle with a sound, for example. In one embodiment, the vehicle exterior sounding system 5 may serve as a "vehicle exterior sounding device". For example, the vehicle exterior sounding system 5 may output a sound resembling engine driving noises from a speaker 6 to the outside of the vehicle. The vehicle exterior sounding system 5 may be controlled by a vehicle exterior sounding controller 7. In one embodiment, the vehicle exterior sounding controller 7 may serve as a "battery state notification device". The electric vehicle may be provided with an air-bag system 8 that unfolds a non-illustrated air bag. Upon a collision of the vehicle, the air-bag system 8 may unfold an air bag corresponding to the collision site in response to activation of an inflator corresponding to the air bag. The activation of the inflator may be controlled by an air-bag controller 9 on the basis of an output signal received from a non-illustrated collision sensor, such as an acceleration sensor. In one embodiment, the air-bag controller 9 may serve as a "collision detector". The vehicle may further include a smart entry system 10. When a non-illustrated mobile device is brought close to the vehicle, the smart entry system 10 may unlock a door lock without using an unlocking key, or may cause the vehicle to be ready for traveling without using an ignition key. The smart entry system 10 may lock and unlock the door lock and cause the vehicle to be ready for traveling under the control of a smart entry controller 11 via wireless communication with the mobile device.

The electric vehicle may further include a frontward recognition system 12. The frontward recognition system 12 may include a frontward imaging unit 13. The frontward imaging unit 13 may be a known stereo camera, for example. For instance, the frontward recognition system 12 may recognize an object present in front of the vehicle, a relative relation, such as a relative position or a relative speed, between the vehicle and the object, and a condition of a lane line using a known image analysis algorithm, such as model matching, based on image data acquired by the forward imaging unit 13. The frontward recognition system 12 may be controlled by a frontward recognition controller 14. The electric vehicle may further include a rearward-object detection system 15 including a rearward-object detection sensor 16. The rearward-object detection sensor 16 may be an ultrasonic sonar, for example. The rearward-object detection system 15 may detect, for example, an object present behind the vehicle, and a relative relation, such as a relative position, between the vehicle and the object on the basis of an output signal of the rearward-object detection sensor 16. The rearward-object detection system 15 may be controlled by a rearward-object detection controller 17. The electric vehicle may further include a corner sensor system 18. The corner sensor system 18 may include corner sensors 19 respectively disposed at front, back, right, and left corners of the vehicle. The corner sensors 19 may be ultrasonic sonars, for example. The corner sensor system 18 may detect, for example, an object present near each of the four corners of the vehicle, a relative relation, such as a relative position, between the vehicle and the objects on the basis of output signals of the corner sensors 19. The corner sensor system 18 may be controlled by a corner sensor controller 20.

The smart entry controller 11 and other various controllers may be implemented by a computer system such as a microcomputer. Similarly to a known computer system, the computer system may include a processor that performs advanced calculation, a storage that stores programs and the like, and an input/output device that reads sensor signals and mutually communicates with other controllers.

Figure 2:
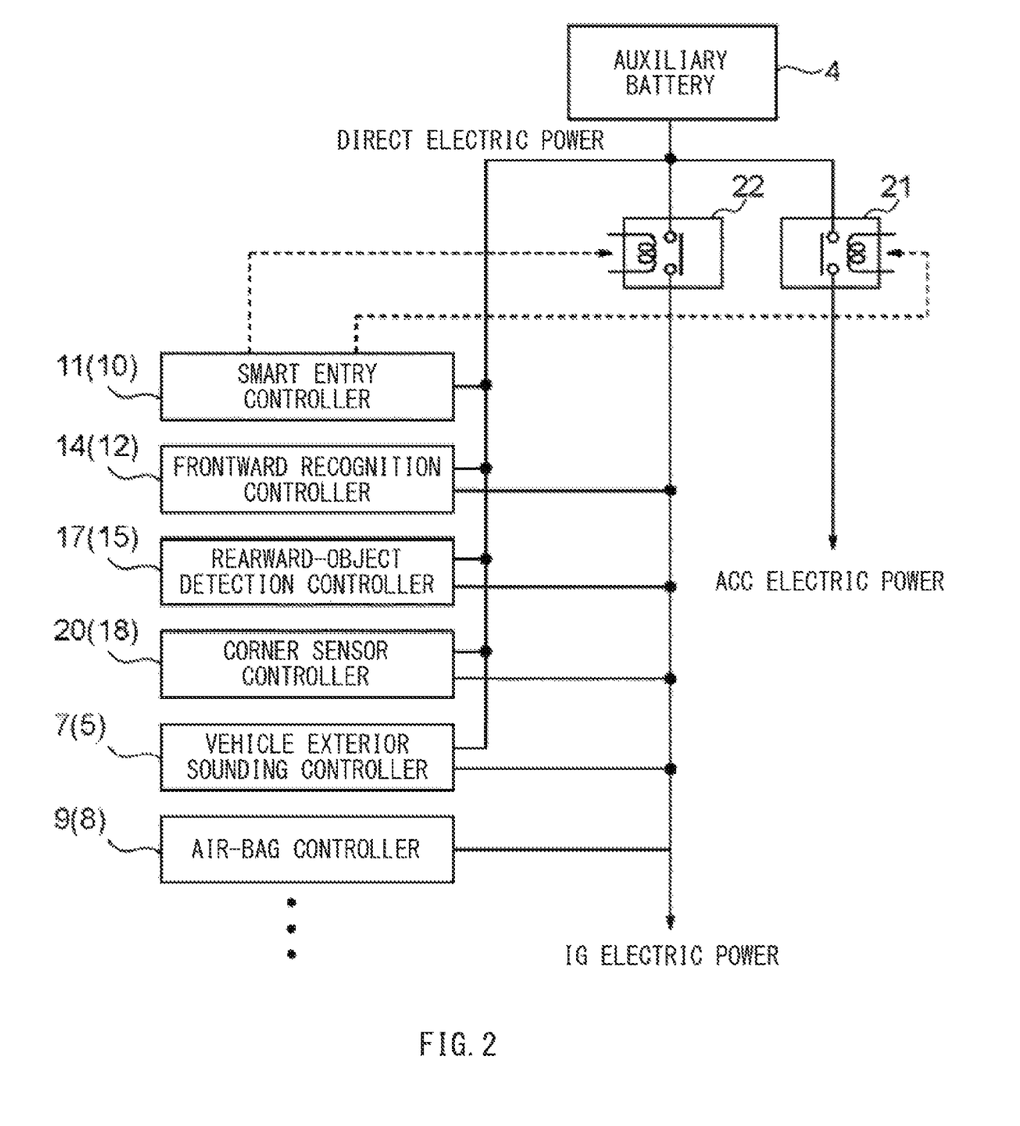
FIG. 2 is a schematic diagram illustrating an exemplary coupling state of an auxiliary battery illustrated in FIG. 1.

FIG. 2 schematically illustrates an exemplary coupling state between the auxiliary battery 4 and the various controllers described above. For example, the auxiliary battery 4 may be a DC battery of 12 volts, as described above. In this example embodiment, electric power from the auxiliary battery 4 may be distributed to three lines. The leftmost one of the three lines illustrated in FIG. 2 may be direct electric power (power source) with no intervention. The remaining two lines may be electric power via respective relays 21 and 22. In one embodiment, the relays 21 and 22 may serve as a "switching circuit". The rightmost one of the three lines illustrated in FIG. 2 may be so-called accessory (ACC) electric power (power source) via the relay 21, which may be an ACC power relay. For example, the ACC power line may be coupled to non-illustrated electrical components of the vehicle irrelevant to driving of the vehicle, such as an audio visual (AV) device and an air conditioner of the vehicle. The middle one of the three lines illustrated in FIG. 2 may be so-called ignition (IG) electric power (power source) via the relay 22. The relay 22 may be an IG power relay. For example, the IG power line may be coupled to non-illustrated electrical components of the vehicle relevant to driving of the vehicle, such as a starter motor, a windshield wiper, and a turn signal that are not illustrated in FIG. 2. In this example embodiment, the ACC power relay 21 and the IG power relay 22 serving as the switching circuits of the auxiliary battery 4 may be switched (turned on/off) by the smart entry controller 11.

The various controllers described above may be relevant to driving of the vehicle; therefore, like the air-bag controller 9 illustrated in the drawings, these controllers may be supplied with the IG electric power. In this example embodiment, the vehicle exterior sounding controller 7, the frontward recognition controller 14, the rearward-object detection controller 17, and the corner sensor controller 20 may be supplied with both of the IG electric power and the direct electric power. Further, in this example embodiment, the smart entry controller 11 may be supplied with only the direct electric power. Note that each of the controllers that is supplied with both of the IG electric power and the direct electric power may include an AND circuit in its power circuit. The AND circuit may be turned on to supply electric power when both the direct electric power and the IG electric power are turned on together. Each of the controllers that is supplied with both of the IG electric power and the direct electric power may further include a switch, such as a relay, in its bypass circuit that bypasses the AND circuit and is coupled to the direct power source. Accordingly, turning on the switch in the bypass circuit may cause the direct electric power to be supplied even while the IG electric power is turned off, for example. Note that, hereinafter, the direct electric power supplied from the auxiliary battery 4 may also be referred to as a direct power source, the ACC electric power supplied from the auxiliary battery 4 as an ACC power source, and the IG electric power supplied from the auxiliary battery 4 as an IG power source.

In this example embodiment, the vehicle exterior sounding system 5 makes notification about information on electric leakage from the drive battery 2 upon a collision of the vehicle. In this embodiment, the frontward recognition system 12, the rearward-object detection system 15, and the corner sensor system 18 detect the conditions around the vehicle, such as the presence of a person approaching the vehicle, for example. In one embodiment, the frontward recognition system 12, the rearward-object detection system 15, and the corner sensor system 18 may serve as a "surrounding condition detector". When the surrounding condition detector detects a person present around the vehicle, the vehicle exterior sounding system 5 makes notification about the information on electric leakage from the drive battery 2. Note that the information on electric leakage from the drive battery 2 upon a collision of the vehicle may include data indicative of the occurrence or absence of electric leakage.

Figure 3:
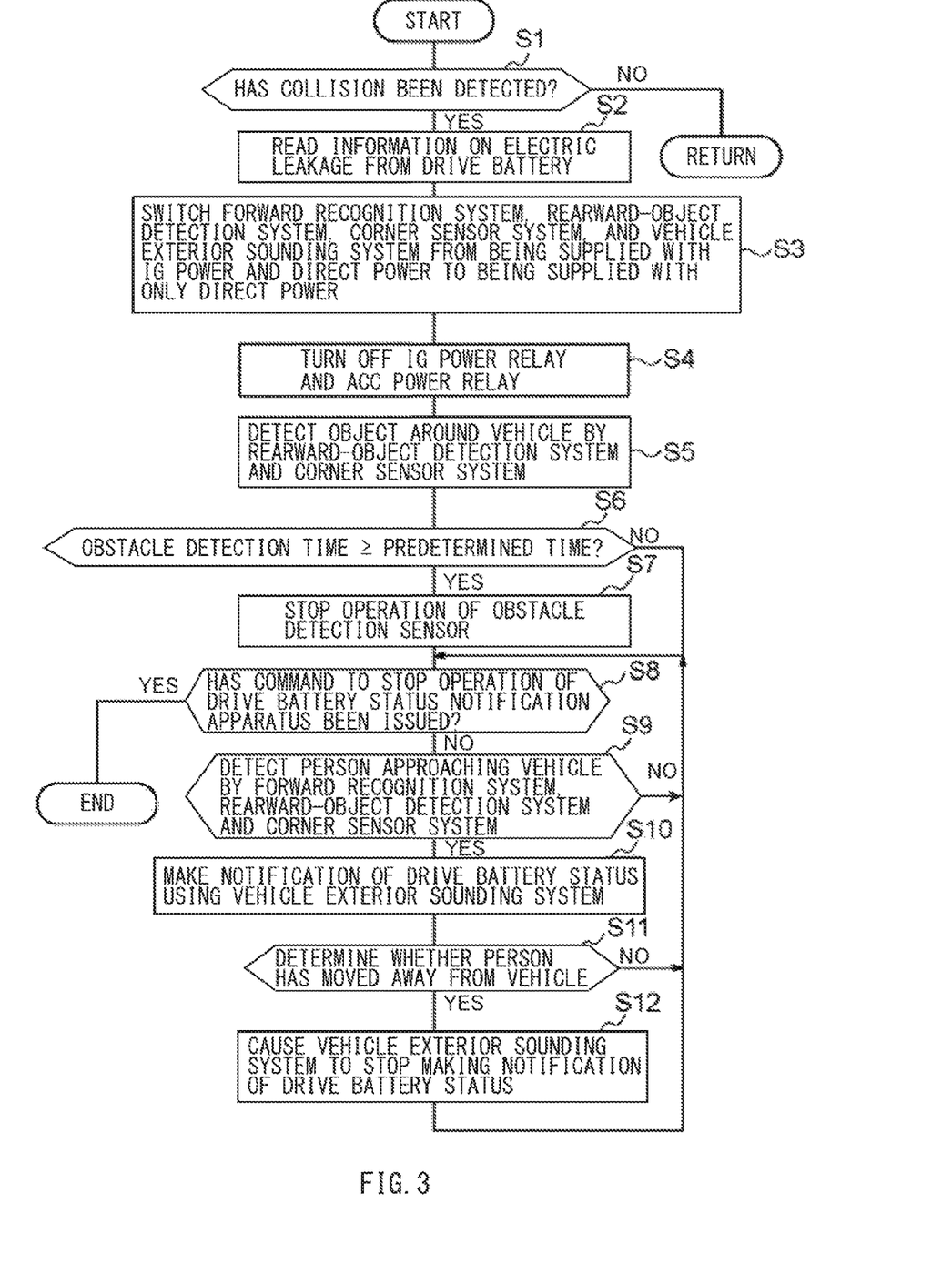
FIG. 3 is a flowchart of an operational procedure executed by a smart entry controller illustrated in FIG. 1.

FIG. 3 is a flowchart of an operational procedure executed by the smart entry controller 11 to make notification about the state of electric leakage from the drive battery 2. The operational procedure may involve timer interruption processing in every predetermined sampling cycle until a collision of the vehicle is detected, for example. First, in Step S1, the smart entry controller 11 may determine whether the air bag has been unfolded, i.e., whether a collision of the vehicle has been detected, by mutually communicating with the air-bag controller 9, for example. If a collision of the vehicle has been detected (Step S1: YES), the procedure may proceed to Step S2. If no collision of the vehicle has been detected (Step S1: NO), the procedure may return.

In Step S2, the smart entry controller 11 may read the information on electric leakage from the drive battery 2 by mutually communicating with the battery controller 3, for example. As described above, the information on electric leakage may include the data indicative of the occurrence or absence of electric leakage from the drive battery 2.

In Step S3, the smart entry controller 11 may switch the frontward recognition system 12 (the frontward recognition controller 14), the rearward-object detection system 15 (the rearward-object detection controller 17), the corner sensor system 18 (the corner sensor controller 20), and the vehicle exterior sounding system 5 (the vehicle exterior sounding controller 7) from being supplied with electric power from both of the IG power source and the direct power source to being supplied with electric power only from the direct power source.

In Step S4, the smart entry controller 11 may turn off the IG power relay 22 and the ACC power relay 21.

In Step S5, the smart entry controller 11 may cause the rearward-object detection system 15 and the corner sensor system 18 to detect the presence of an obstacle around the vehicle. The obstacle may be a static object produced by the collision of the vehicle and present around the vehicle.

In Step S6, the smart entry controller 11 may determine whether the detection of an obstacle in Step S5 has been performed for a predetermined time or longer. If the detection of an obstacle has been performed for the predetermined time or longer (Step S6: YES), the procedure may proceed to Step S7. If the detection of an obstacle has not been performed for the predetermined time or longer (Step S6: NO), the procedure may proceed to Step S8.

In Step S7, the smart entry controller 11 may stop the operation of any of the rearward-object detection system 15 and the corner sensor system 18 that has detected the obstacle in Step S5, and may cause the procedure to proceed to Step S8. The operation of the sensor may be stopped by stopping the supply of electric power to the sensor or ignoring a corresponding output from the sensor, for example.

In Step S8, the smart entry controller 11 may determine whether a command to stop the operation of the drive battery state notification apparatus has been issued by a preset measure or method. If the command to stop the operation has been issued (Step S8: YES), the operational procedure may be terminated. If no command to stop the operation has been issued (Step S9: NO), the procedure may proceed to Step S9.

In Step S9, the smart entry controller 11 may determine whether the presence of a person approaching the vehicle has been detected by the frontward recognition system 12, the rearward-object detection system 15, or the corner sensor system 18. If the presence of a person approaching the vehicle has been detected (Step S9: YES), the procedure may proceed to Step S10. If the presence of a person approaching the vehicle has not been detected (Step S9: NO), the procedure may proceed to Step S8.

In Step S10, the smart entry controller 11 may cause the vehicle exterior sounding system 5 to make notification about the information on electric leakage from the drive battery 2, and cause the procedure to proceed to Step S11. The notification about the information on electric leakage from the drive battery 2 may be made using a human voice saying "electricity is leaking from the drive battery" or "electricity is not leaking from the drive battery", for example.

In Step S11, the smart entry controller 11 may determine whether the person detected as approaching the vehicle in Step S9 described above has moved away from the vehicle. If the person has moved away from the vehicle (Step S11: YES), the procedure may proceed to Step S12. If the person has not moved away from the vehicle (Step S11: NO), the procedure may proceed to Step S8.

In Step S12, the smart entry controller 11 may cause the vehicle exterior sounding system 5 to stop making the notification about the information on electric leakage from the drive battery 2, and the procedure may proceed to Step S8.

In the operational procedure, the smart entry controller 11 may read the information on electric leakage from the drive battery 2 by mutually communicating with the battery controller 3 upon a collision of the vehicle. The frontward recognition system 12, the rearward-object detection system 15, and the corner sensor system 18, which serve as the surrounding condition detector, and the vehicle exterior sounding system 5, which notifies a person outside the vehicle of the information on electric leakage from the drive battery 2, may be switched to be supplied with the direct electric power from the auxiliary battery 4, and the ACC power relay 21 and the IG power relay 22 may be turned off. In the operational procedure, the vehicle exterior sounding system 5 may notify a person outside the vehicle of the information on electric leakage from the drive battery 2, as described above. For example, the information on electric leakage from the drive battery 2 may be provided to a person engaged in rescue operations. In general, as disclosed in JP-A Nos. 2010-76736, 2010-193691, and 2000-92605, for example, the drive battery 2 may be separated from the drive system upon a collision of the vehicle; therefore, the notification about the information on electric leakage from the drive battery 2 may be made using electric power from the auxiliary battery 4. However, a collision of the vehicle can occur in any vehicle state, and rescue operations can be made at any time. To address these circumstances, in the example embodiment, the ACC power relay 21 and the IG power relay 22 may be turned off to reduce the electric power to be consumed by operations other than making the notification about the information on electric leakage from the drive battery. This allows the notification about the information on electric leakage from the drive battery 2 to be made for a period of time as long as possible. In addition, keeping the ACC power relay 21 and the IG power relay 22 turned on may need relatively large electric power. Therefore, another reason for turning off the ACC power relay 21 and the IG power relay 22 is to save the electric power for keeping the ACC power relay 21 and the IG power relay 22 turned on without wasting the electric power.

In the example embodiment, the frontward recognition system 12, the rearward-object detection system 15, and the corner sensor system 18 are used as the surrounding condition detector that detects the presence of a person approaching the vehicle. Only when detecting a person approaching the vehicle, the surrounding condition detector may notify the person of the information on electric leakage from the drive battery 2. This also helps to reduce electric consumption of the auxiliary battery 4, enabling the notification about the information on electric leakage from the drive battery 2 to be made for an extended period of time. Further, in one example in which ultrasonic sensors are used in the rearward-object detection system 15 and the corner sensor system 18, these sensors have difficulties in identifying whether a detected object, i.e., an object present near the sensors, is a person or an obstacle produced by a collision. An obstacle produced by a collision is a static body; therefore, in a case where the rearward-object detection system 15 and the corner sensor system 18 detect an identical object present near the vehicle for a predetermined time period or longer, the object may be identified as a static obstacle generated by a collision. In such a case, the operation of the sensors detecting the obstacle may be stopped to properly detect a person approaching the vehicle and notify the person of the information on electric leakage from the drive battery 2.

According to the battery state notification apparatus of the example embodiment described above, the vehicle exterior sounding system 5 makes notification about the information on electric leakage from the drive battery 2 in a case where the frontward recognition system 12, the rearward-object detection system 15, and the corner sensor system 18, which serve as the surrounding condition detector, detect a person present around the vehicle after the detection of a collision of the vehicle. Such notification may indicate the occurrence or absence of electric leakage from the drive battery 2, which helps to prevent the person approaching the vehicle from being electrically shocked.

Further, electric power supplied from the auxiliary battery 4 via the ACC power relay 21 or the IG power relay 22 may be stopped upon a collision of the vehicle. Accordingly, the amount of electric power of the auxiliary battery 4 to be consumed by electrical components coupled to the downstream of the ACC power relay 21 or the IG power relay 22 may become zero or decrease. This reduction in electric consumption allows the vehicle exterior sounding system 5 to keep making notification about the information on electric leakage from the drive battery 2 for an extended period of time. Additionally, the vehicle exterior sounding system 5 and the surrounding condition detector including the frontward recognition system 12, the rearward-object detection system 15, and the corner sensor system 18 that are relevant to making the notification about the battery state may be switched to be supplied with electric power directly supplied from the auxiliary battery 4. This also allows the notification about the battery state to be made for an extended period of time.

Further, in a case where there is no possibility of giving electrical shock to a person present around the vehicle, the vehicle exterior sounding system 5 may stop notifying the person of the electric leakage from the battery. This helps to reduce the amount of electric power of the auxiliary battery 4 to be consumed by the notification about the state of electric leakage from the battery. This reduction in electric consumption leads to an increase in the period of time in which the notification about the battery state is made, resulting in a reduction of the possibility of giving electrical shock.

The battery state notification apparatus according to some example embodiments of the technology have been described above. However, it should be appreciated that the foregoing example embodiments of the technology are merely illustrative and non-limiting examples and are not intended to limit the scope of the technology. For example, although the operational procedure described with reference to FIG. 3 may be executed by the smart entry controller 11 in the example embodiments described above, the operational procedure may alternatively be executed by another controller. Still alternatively, the steps of the operational procedure may be executed by respective controllers that mutually communicate with each other.

Although the frontward recognition system 12, the rearward-object detection system 15, and the corner sensor system 18 may detect surrounding conditions around the vehicle in the example embodiments described above, this is a non-limiting example. In an alternative example, side-view cameras that capture images of environments on respective sides of the vehicle and a rear-view camera that captures an image of an environment behind the vehicle may be provided to detect surrounding conditions on the sides of the vehicle and behind the vehicle, in addition to the frontward recognition system 12.

According to some example embodiments described above, the vehicle exterior sounding system 5 may make notification about the occurrence or absence of electric leakage from the drive battery 2 using a voice sound; however, in an alternative example, the notification about the state of electric leakage from the drive battery 2 may be made using an alarm.

According to some example embodiments described above, the air-bag controller 9 that unfolds the air-bag may be used as a collision detector that detects a collision of the vehicle; however, in an alternative embodiment, a camera that captures an image of the surrounding condition around the vehicle may be used as a detector that detects a collision of the vehicle.

According to at least one example embodiment of the technology, in a case where a person present around the vehicle is detected by, for example, the surrounding condition detector such as in-vehicle cameras or an obstacle detector after detection of a collision of the vehicle, the vehicle exterior sounding device notifies the person of the state of electric leakage from the drive battery. Such notification about the occurrence of electric leakage from the drive battery helps to prevent a person approaching the vehicle from being electrically shocked.

According to some example embodiment of the technology, upon a collision of the vehicle, electric power supply from the auxiliary battery via the switching circuit may be stopped, and thus the amount of electric power of the auxiliary battery to be consumed by the electrical components coupled to the downstream of the switching circuit may become zero or decrease. This reduction in electric consumption allows the vehicle exterior sounding system to keep making the notification about the battery state for an extended period of time. Additionally, the vehicle exterior sounding device and the surrounding condition detector relevant to the notification about the battery state may be switched to be supplied with electric power directly supplied from the auxiliary battery. This also allows the notification about the battery state to be made for an extend time period.

According to at least one example embodiment of the technology, in a case where there is no possibility of giving electrical shock to a person present around the vehicle, the amount of electric power of the auxiliary battery to be consumed by the vehicle exterior sounding device upon the notification about the state of electric leakage from the battery may be reduced. This reduction in electric consumption leads to an increase in the period of time in which the notification about the battery state is made, resulting in a reduction in the possibility of giving electrical shock.

According to at least one example embodiment of the technology described above, it is possible to avoid giving electrical shock upon a collision of an electric vehicle. This ensures rapid rescue operations, for example.

It should be appreciated that the foregoing example embodiments of the technology described merely illustrative and non-limiting and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

One or more of the battery controller 3, the vehicle exterior sounding controller 7, and the air-bag controller 9, illustrated in FIGS. 1 and 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the battery controller 3, the vehicle exterior sounding controller 7, and the air-bag controller 9. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the battery controller 3, the vehicle exterior sounding controller 7, and the air-bag controller 9 illustrated in FIGS. 1 and 2.

The invention claimed is:

1. A battery state notification apparatus for an electric vehicle, the apparatus being configured to make notification about a state of electric leakage from a drive battery after a collision of the electric vehicle, the apparatus comprising:
   a collision detector configured to detect the collision of the electric vehicle;
   an electric leakage detector configured to detect the state of the electric leakage from the drive battery;
   a surrounding condition detector configured to detect a surrounding condition around the electric vehicle, the surrounding condition including presence of a person around the electric vehicle;
   a vehicle exterior sounding device configured to output a sound to an outside of the electric vehicle;
   a battery state notification device configured to cause the vehicle exterior sounding device to make the notification about the state of the electric leakage from the drive battery detected by the electric leakage detector in a case where the collision detector detects the collision of the electric vehicle and where the surrounding condition detector detects the presence of the person around the electric vehicle;
   an auxiliary battery having a lower voltage than the drive battery; and
   a first switching circuit configured to allow electric power of the auxiliary battery to be supplied or to prevent the electric power of the auxiliary battery from being supplied, wherein
   the vehicle exterior sounding device and the surrounding condition detector are switchable between being supplied with the electric power of the auxiliary battery fed directly from the auxiliary battery and being supplied with the electric power of the auxiliary battery fed via the first switching circuit,
   the electric power of the auxiliary battery is fed directly from the auxiliary battery to first electrical components via an electrical path, the electrical path omitting a switching circuit,
   the first electrical components include the vehicle exterior sounding device and the surrounding condition detector and excludes the collision detector,
   the electric power of the auxiliary battery is fed from the auxiliary battery to second electrical components via the first switching circuit,
   the second electrical components include the vehicle exterior sounding device, the surrounding condition detector, and the collision detector,
   in a case where the collision detector detects the collision of the electric vehicle, the battery state notification device is configured to stop the electric power of the auxiliary battery from being fed to the second electrical components via the first switching circuit, and to allow the electric power of the auxiliary battery to be fed only to the first electrical components so that the vehicle exterior sounding device and the surrounding condition detector are driven with only the electric power of the auxiliary battery fed directly from the auxiliary battery.

2. The battery state notification apparatus according to claim 1, wherein
   the battery state notification device is configured to cause the vehicle exterior sounding device to stop making the notification about the state of the electric leakage from the drive battery when the presence of the person around the electric vehicle is no longer detected by the surrounding condition detector.

3. The battery state notification apparatus according to claim 1, wherein
in the case where the collision detector detects the collision of the electric vehicle and where the surrounding condition detector detects the presence of the person around the electric vehicle following the detection of the collision of the electric vehicle, the surrounding condition detector detects the presence of the person by detecting the person approaching the vehicle.

4. The battery state notification apparatus according to claim 1, wherein
the battery state notification apparatus further comprises a smart entry controller, and
the surrounding condition detector comprises a rearward-object detection system, a frontward recognition system, and a corner sensor system, wherein
the surrounding condition further includes presence of an obstacle around the vehicle detected by at least one of the rearward-object detection system, the frontward recognition system, and the corner sensor system for a predetermined time or longer, and
the smart entry controller is configured to, in the case where the collision of the electric vehicle is detected, stop operation of the at least one of the rearward-object detection system, the frontward recognition system, and the corner sensor system that has detected the obstacle around the vehicle for the predetermined time or longer.

5. The battery state notification apparatus according to claim 1, wherein
the first electrical components consist of a smart entry controller, the surrounding condition detector, and the vehicle exterior sounding device, and
the surrounding condition detector consists of one or more detection systems configured to detect an obstacle around the vehicle and including one or more sensors.

6. The battery state notification apparatus according to claim 5, wherein
the auxiliary battery is configured to supply electric power to third electrical components via a second switching circuit,
the second switching circuit configured to allow electric power of the auxiliary battery to be supplied or to prevent the electric power of the auxiliary battery from being supplied, and
the second electrical components consist of electrical components of the vehicle relevant to driving of the vehicle,
the third electrical components consist of electrical components of the vehicle irrelevant to driving of the vehicle, and
in a case where the collision detector detects the collision of the electric vehicle, the battery state notification device is configured to stop the electric power of the auxiliary battery from being fed to the third electrical components via the second switching circuit, and to allow the electric power of the auxiliary battery to be fed only to the first electrical components so that the vehicle exterior sounding device and the surrounding condition detector are driven with only the electric power of the auxiliary battery fed directly from the auxiliary battery.

7. A battery state notification apparatus for an electric vehicle, the apparatus being configured to make notification about a state of electric leakage from a drive battery after a collision of the electric vehicle, the apparatus comprising:
a surrounding condition detector comprising a sensor and configured to detect a surrounding condition around the electric vehicle, the surrounding condition including presence of a person around the electric vehicle;
a vehicle exterior sounding device comprising a speaker configured to output a sound to an outside of the electric vehicle;
a collision detector comprising a sensor and configured to detect the collision of the electric vehicle;
circuitry configured to
detect the state of the electric leakage from the drive battery, and
cause the vehicle exterior sounding device to make the notification about the detected state of the electric leakage from the drive battery in a case where the collision of the electric vehicle is detected and where the surrounding condition detector detects the presence of the person around the electric vehicle;
an auxiliary battery having a lower voltage than the drive battery; and
a first switching circuit configured to allow electric power of the auxiliary battery to be supplied or to prevent the electric power of the auxiliary battery from being supplied, wherein
the vehicle exterior sounding device and the surrounding condition detector are switchable between being supplied with the electric power of the auxiliary battery fed directly from the auxiliary battery and being supplied with the electric power of the auxiliary battery fed via the first switching circuit,
the electric power of the auxiliary battery is fed directly from the auxiliary battery to first electrical components via an electrical path, the electrical path omitting a switching circuit,
the first electrical components include the vehicle exterior sounding device and the surrounding condition detector and excludes the collision detector,
the electric power of the auxiliary battery is fed from the auxiliary battery to a second electrical components via the first switching circuit,
the second electrical components include the vehicle exterior sounding device, the surrounding condition detector, and the collision detector,
in a case where the collision detector detects the collision of the electric vehicle, the circuitry is configured to stop the electric power of the auxiliary battery from being fed to the second electrical components via the first switching circuit, and to allow the electric power of the auxiliary battery to be fed only to the first electrical components so that the vehicle exterior sounding device and the surrounding condition detector are driven with only the electric power of the auxiliary battery fed directly from the auxiliary battery.

8. The battery state notification apparatus according to claim 7, wherein
in the case where the collision of the electric vehicle is detected and where the surrounding condition detector detects the presence of the person around the electric vehicle following the detection of the collision of the electric vehicle, the surrounding condition detector detects the presence of the person by detecting the person approaching the vehicle.

9. The battery state notification apparatus according to claim 7, wherein
- the surrounding condition detector comprises a rearward-object detection system, a frontward recognition system, and a corner sensor system, wherein
- the surrounding condition further includes presence of an obstacle around the vehicle detected by at least one of the rearward-object detection system, the frontward recognition system, and the corner sensor system for a predetermined time or longer, and
- the circuitry is configured to, in the case where the collision of the electric vehicle is detected, stop operation of the at least one of the rearward-object detection system, the frontward recognition system, and the corner sensor system that has detected the obstacle around the vehicle for the predetermined time or longer.

10. The battery state notification apparatus according to claim 7, wherein
- the first electrical components consist of a smart entry controller, the surrounding condition detector, and the vehicle exterior sounding device, and
- the surrounding condition detector consists of one or more detection systems configured to detect an obstacle around the vehicle and including one or more sensors.

11. The battery state notification apparatus according to claim 10, wherein
- the auxiliary battery is configured to supply electric power to third electrical components via a second switching circuit,
- the second switching circuit configured to allow electric power of the auxiliary battery to be supplied or to prevent the electric power of the auxiliary battery from being supplied, and
- the second electrical components consist of electrical components of the vehicle relevant to driving of the vehicle,
- the third electrical components consist of electrical components of the vehicle irrelevant to driving of the vehicle, and
- in a case where the collision detector detects the collision of the electric vehicle, the circuitry is configured to stop the electric power of the auxiliary battery from being fed to the third electrical components via the second switching circuit, and to allow the electric power of the auxiliary battery to be fed only to the first electrical components so that the vehicle exterior sounding device and the surrounding condition detector are driven with only the electric power of the auxiliary battery fed directly from the auxiliary battery.

* * * * *